United States Patent [19]

Murray et al.

[11] Patent Number: 5,536,512
[45] Date of Patent: Jul. 16, 1996

[54] IMPROVEMENTS IN PRODUCTION OF FERMENTED MALT BEVERAGES

[75] Inventors: Cameron R. Murray; William J. Van Der Meer, both of London, Canada

[73] Assignee: Labatt Brewing Company Limited, London, Canada

[21] Appl. No.: 194,231

[22] Filed: Feb. 7, 1994

Related U.S. Application Data

[63] Continuation of Ser. No. 35,805, Mar. 23, 1993, Pat. No. 5,304,384.

[51] Int. Cl.⁶ ...................................................... C12H 1/00
[52] U.S. Cl. .......................... 426/16; 426/330.4; 426/490; 426/495
[58] Field of Search .......................... 426/16, 490, 495, 426/330.4

[56] References Cited

U.S. PATENT DOCUMENTS

| | | |
|---|---|---|
| 134,389 | 12/1872 | Mefford . |
| 173,494 | 2/1876 | Purdy . |
| 232,071 | 9/1880 | Sawyer . |
| 243,157 | 6/1881 | Ramsay . |
| 485,341 | 11/1892 | Cushing . |
| 574,111 | 12/1896 | Pridham . |
| 657,698 | 9/1990 | Hasbrouck . |
| 698,184 | 4/1902 | Duffy . |
| 855,449 | 6/1907 | Dorn . |
| 1,234,255 | 7/1917 | Ash ..................................... 426/330.4 |
| 1,280,280 | 10/1918 | Nathan . |

(List continued on next page.)

FOREIGN PATENT DOCUMENTS

| | | |
|---|---|---|
| 224576 | 8/1958 | Australia . |
| 473382 | of 0000 | Canada . |
| 46798 | 4/1894 | Canada . |
| 173898 | 3/1915 | Canada . |
| 341491 | 5/1934 | Canada . |
| 349668 | 4/1935 | Canada . |
| 372562 | 3/1939 | Canada . |
| 384056 | 9/1939 | Canada . |
| 398981 | 9/1941 | Canada . |
| 406879 | 8/1942 | Canada . |
| 424305 | 12/1944 | Canada . |
| 483017 | 5/1952 | Canada . |
| 517208 | 10/1955 | Canada . |
| 543869 | 7/1957 | Canada . |
| 542994 | 7/1957 | Canada . |
| 582002 | of 1959 | Canada . |
| 578304 | of 1959 | Canada . |
| 601487 | 7/1960 | Canada . |
| 629704 | 10/1961 | Canada . |
| 672771 | 10/1963 | Canada . |
| 673672 | 11/1963 | Canada . |

(List continued on next page.)

OTHER PUBLICATIONS

G. Hawley, The Condensed Chemical Dictionary, 10th Ed., VNR, New York, 1981,m p. 21.

H. Broderick, Ed. The Practical Brewer, 2nd Ed., MBAA, Madson, WI, 1977 pp. 243–246, 224 to 226.

Primary Examiner—Donald E. Czaja
Assistant Examiner—Curtis E. Sherrer
Attorney, Agent, or Firm—Levy, Zito & Grandinetti

[57] ABSTRACT

A process for preparing a fermented malt beverage wherein brewing materials are mashed with water and the resulting mash is heated and wort separated there from. The wort is boiled, cooled and fermented and the beer is subjected to a finishing stage, which includes aging, to produce the final beverage. The improvement comprises subjecting the beer to a cold stage comprising rapidly cooling the beer to a temperature of about its freezing point in such a manner that ice crystals are formed therein in only minimal amounts. The resulting cooled beer is then mixed for a short period of time with a beer slurry containing ice crystals, without any appreciable collateral increase in the mount of ice crystals in the resulting mixture. Finally, the so-treated beer is extracted from the mixture.

27 Claims, 3 Drawing Sheets

5,536,512
Page 2

U.S. PATENT DOCUMENTS

| | | | |
|---|---|---|---|
| 1,724,021 | 8/1929 | Heuser | 426/330.4 |
| 1,930,570 | 10/1933 | Taylor. | |
| 1,988,954 | 1/1935 | Nathan et al. . | |
| 2,027,100 | 1/1936 | Hochwalt et al. . | |
| 2,027,129 | 1/1936 | Thomas et al. . | |
| 2,032,818 | 3/1936 | Sweek et al. . | |
| 2,036,167 | 3/1936 | Cox . | |
| 2,040,661 | 5/1936 | Liebmann . | |
| 2,050,908 | 8/1936 | Willkie . | |
| 2,086,080 | 7/1937 | Herrick . | |
| 2,091,030 | 8/1937 | Davis . | |
| 2,108,030 | 2/1938 | Darrah . | |
| 2,145,243 | 1/1939 | Bagby . | |
| 2,157,633 | 5/1939 | Schapiro | 426/330.4 |
| 2,181,838 | 11/1939 | Tressler . | |
| 2,181,839 | 11/1939 | Tressler . | |
| 2,322,749 | 6/1943 | Silhavy . | |
| 2,354,092 | 7/1944 | Stein . | |
| 2,510,498 | 6/1950 | Gaeng . | |
| 2,637,652 | 5/1953 | Ryan . | |
| 2,652,333 | 9/1953 | Nilsson et al. . | |
| 2,657,549 | 11/1953 | Wenzelberger . | |
| 2,688,550 | 9/1954 | McFarlane . | |
| 2,791,333 | 5/1957 | McKay . | |
| 2,807,547 | 9/1957 | Nickol . | |
| 2,874,199 | 2/1959 | Tarr . | |
| 2,879,165 | 3/1959 | Hendel . | |
| 2,887,851 | 5/1959 | Toulmin, Jr. . | |
| 2,916,377 | 12/1959 | Shaler et al. . | |
| 2,939,791 | 6/1960 | McFarlane . | |
| 3,004,395 | 10/1961 | Morris, Jr. . | |
| 3,071,469 | 1/1963 | Krabbe et al. . | |
| 3,128,188 | 4/1964 | McIntire . | |
| 3,145,106 | 8/1964 | Goerl . | |
| 3,214,371 | 10/1965 | Tuwiner . | |
| 3,240,025 | 3/1966 | Malick et al. . | |
| 3,251,693 | 5/1966 | Brenner . | |
| 3,255,598 | 6/1966 | Cottle . | |
| 3,283,522 | 11/1966 | Ganiaris . | |
| 3,285,022 | 11/1966 | Pike . | |
| 3,285,025 | 11/1966 | Shaul . | |
| 3,298,835 | 1/1967 | Hilderbrand et al. . | |
| 3,344,616 | 10/1967 | Owen . | |
| 3,404,006 | 10/1968 | Malick . | |
| 3,404,012 | 10/1968 | Craig . | |
| 3,449,128 | 6/1969 | Yamada et al. . | |
| 3,515,560 | 6/1970 | Shorewood . | |
| 3,518,089 | 6/1970 | Warkentin . | |
| 3,698,913 | 10/1972 | Maltnim . | |
| 3,713,839 | 1/1973 | Delente et al. . | |
| 3,729,321 | 4/1973 | Vacano . | |
| 3,754,407 | 8/1973 | Tyree, Jr. . | |
| 3,815,377 | 6/1974 | Tyree, Jr. . | |
| 3,922,878 | 12/1975 | Jalali . | |
| 3,930,042 | 12/1975 | Dunnet . | |
| 3,940,498 | 2/1976 | Butterworth et al. . | |
| 4,004,886 | 1/1977 | Thijssen et al. . | |
| 4,041,180 | 8/1977 | Wilson . | |
| 4,112,128 | 9/1978 | Fessler | 426/422 |
| 4,143,524 | 3/1979 | Thijssen . | |
| 4,177,051 | 12/1979 | Adams, Jr. . | |
| 4,188,797 | 2/1980 | Thijssen et al. . | |
| 4,238,511 | 12/1980 | Egretier . | |
| 4,249,388 | 2/1981 | Burns . | |
| 4,265,920 | 5/1981 | Thijssen . | |
| 4,302,476 | 11/1981 | Lunt . | |
| 4,316,368 | 2/1982 | Van Pelt et al. . | |
| 4,322,446 | 3/1982 | Heess | 426/330.4 |
| 4,329,433 | 5/1982 | Seebeck et al. . | |
| 4,332,140 | 6/1982 | Thijssen et al. . | |
| 4,338,109 | 7/1982 | Thijssen et al. . | |
| 4,346,113 | 8/1982 | Faust et al. . | |
| 4,351,851 | 9/1982 | Riese | 426/524 |
| 4,406,679 | 9/1983 | Wrobel et al. . | |
| 4,430,104 | 2/1984 | Van Pelt et al. . | |
| 4,440,795 | 4/1984 | Goldstein et al. . | |
| 4,459,144 | 7/1984 | Van Pelt et al. . | |
| 4,468,407 | 8/1984 | Vella . | |
| 4,475,355 | 10/1984 | Thijssen et al. . | |
| 4,481,169 | 11/1984 | Van Der Malen . | |
| 4,508,553 | 4/1985 | Thijssen et al. . | |
| 4,557,741 | 12/1985 | Van Pelt . | |
| 4,576,824 | 3/1986 | Gubiev et al. . | |
| 4,624,391 | 11/1986 | Shannon . | |
| 4,652,451 | 3/1987 | Leedham et al. . | |
| 4,666,456 | 5/1987 | Thijssen et al. . | |
| 4,671,077 | 6/1987 | Paradis . | |
| 4,762,622 | 8/1988 | Thijssen . | |
| 4,787,985 | 11/1988 | Roodenrijs et al. . | |
| 4,830,645 | 5/1989 | Ghodsizadeh et al. . | |
| 4,840,737 | 6/1989 | Henriquez . | |
| 4,874,615 | 10/1989 | Gruenhoff et al. . | |
| 4,882,177 | 11/1989 | Dziondziak . | |
| 4,885,184 | 12/1989 | Patino et al. . | |
| 4,889,743 | 12/1989 | Tazawa et al. | 426/495 |
| 4,978,545 | 12/1990 | Cutayar et al. . | |
| 4,995,945 | 2/1991 | Craig . | |
| 4,999,209 | 3/1991 | Gnckow . | |
| 5,013,447 | 5/1991 | Lee et al. . | |
| 5,034,238 | 7/1991 | Seidlitz et al. . | |
| 5,079,025 | 1/1992 | Zobel et al. . | |
| 5,093,141 | 3/1992 | Nemeth et al. . | |
| 5,102,544 | 4/1992 | Roodenrijs . | |
| 5,112,627 | 5/1992 | Perletti et al. . | |
| 5,137,739 | 8/1992 | Roodenrijs . | |
| 5,160,044 | 11/1992 | Tan . | |
| 5,173,318 | 12/1992 | Leu et al. . | |
| 5,304,384 | 4/1994 | Murray et al. | 426/16 |
| 5,346,706 | 9/1994 | Murray et al. | 426/11 |

FOREIGN PATENT DOCUMENTS

| | | |
|---|---|---|
| 675536 | 12/1963 | Canada . |
| 687780 | 6/1964 | Canada . |
| 693689 | 9/1964 | Canada . |
| 699247 | 12/1964 | Canada . |
| 699083 | 12/1964 | Canada . |
| 710662 | 6/1965 | Canada . |
| 732591 | 4/1966 | Canada . |
| 738377 | 6/1966 | Canada . |
| 738321 | 7/1966 | Canada . |
| 740166 | 8/1966 | Canada . |
| 776078 | 1/1968 | Canada . |
| 786308 | 5/1968 | Canada . |
| 785719 | 5/1968 | Canada . |
| 837539 | 3/1970 | Canada . |
| 868324 | 4/1971 | Canada . |
| 872210 | 6/1971 | Canada . |
| 919578 | 1/1973 | Canada . |
| 919083 | 1/1973 | Canada . |
| 937158 | 11/1973 | Canada . |
| 949907 | 6/1974 | Canada . |
| 978876 | 12/1975 | Canada . |
| 1019619 | 10/1977 | Canada . |
| 1033284 | 6/1978 | Canada . |
| 1044506 | 12/1978 | Canada . |
| 1047436 | 1/1979 | Canada . |
| 1045443 | 1/1979 | Canada . |
| 1092884 | 1/1981 | Canada . |
| 1105827 | 7/1981 | Canada . |
| 1131140 | 9/1982 | Canada . |
| 1162473 | 2/1984 | Canada . |
| 1170103 | 7/1984 | Canada . |

| | | | | | | |
|---|---|---|---|---|---|---|
| 1173382 | 8/1984 | Canada . | | 136152 | 6/1979 | Germany . |
| 1183076 | 2/1985 | Canada . | | 136506 | 7/1979 | Germany . |
| 1192833 | 3/1985 | Canada . | | 192663 | 3/1991 | Japan . |
| 1183483 | 3/1985 | Canada . | | 319209 | 3/1957 | Switzerland . |
| 1193960 | 9/1985 | Canada . | | 401716 | 3/1974 | U.S.S.R. . |
| 1195918 | 10/1985 | Canada . | | 545669 | 3/1977 | U.S.S.R. . |
| 1195130 | 10/1985 | Canada . | | 605830 | 4/1978 | U.S.S.R. . |
| 1208416 | 7/1986 | Canada . | | 600178 | 4/1978 | U.S.S.R. . |
| 1213168 | 10/1986 | Canada . | | 664993 | 5/1979 | U.S.S.R. . |
| 1220728 | 4/1987 | Canada . | | 678064 | 8/1979 | U.S.S.R. . |
| 59326 | 3/1988 | Canada . | | 785355 | 12/1980 | U.S.S.R. . |
| 1258438 | 8/1989 | Canada . | | 1463746 | 3/1989 | U.S.S.R. . |
| 2028298 | 4/1991 | Canada . | | 1567620 | 5/1990 | U.S.S.R. . |
| 2028548 | 4/1991 | Canada . | | 9910 | 5/1891 | United Kingdom . |
| 1294907 | 1/1992 | Canada . | | 20974 | 9/1895 | United Kingdom . |
| 1300535 | 5/1992 | Canada . | | 422678 | 1/1935 | United Kingdom . |
| 135916 | 6/1979 | Germany . | | 428518 | 5/1935 | United Kingdom . |

IMPROVEMENTS IN PRODUCTION OF FERMENTED MALT BEVERAGES

This application is a continuation of Ser. No. 08/035,805, filed Mar. 23, 1993, now U.S. Pat. No. 5,304,384.

BACKGROUND OF INVENTION

The process of preparing fermented malt beverages, such as beer, ale, porter, malt liquor and other similar fermented alcoholic brewery beverages, hereinafter referred to simply as "beer" for convenience, is historically well-established. As practised in modern breweries, the process, in brief comprises preparing a "mash" of malt, usually with cereal adjuncts, and heating the mash to solubilize the proteins and convert the starch into sugar and dextrins. The insoluble grains are filtered off and washed with hot water which is combined with the soluble material and the resulting won boiled in a brew kettle to inactivate enzymes, sterilize the wort, extract desired hop components from added hops, and coagulate certain protein-like substances. The wort is then strained to remove spent hops and coagulate, then cooled and pitched with yeast and fermented. The fermented brew known as "green" or "rub" beer is then aged ("lagered") and clarified, tilted, and carbonated to produce the desired beer. In the widely practiced high gravity brewing procedure, beer is brewed at a slightly elevated alcohol content of say 7% to 8% vol/vol alcohol content and this is then diluted to the desired value of say 5% vol/vol.

As is well known, such beers generally develop a haze upon elapse of time and/or through changes in temperature of the beer. This haze is considered to be made up of two types:

(a) "chill haze" which is temperature sensitive and may disappear as the temperature of the beer is raised to, say, room temperature; and (b) "permanent haze" which, as the name implies, once created remains.

If the beer is consumed warm, as in some European countries, then chill haze may be less of a problem but where beer is consumed cold, as is customary in North America, chill haze can be a serious problem.

In any event, in modern times for various reasons such as the closing of many local breweries, etc., the time from when the beer is stored, whether it is in tanks, kegs, bottles, cans, etc., to when it is consumed by the public has increased and this results in the mount of haze which will be formed increasing and, although as indicated above, some of the haze will be of the temperature sensitive-type, the precipitated mount of the components responsible for the permanent haze increases and, eventually, the total haze becomes visible at room temperature.

The exact nature and mode of formation of haze in beer is not known but it is generally accepted that haze comprises significant mounts-of proteins, yeast cells, metals, cell components, polyphenols and various other materials.

The problem of hue formation has been addressed in many ways. The traditional way is, of come, to subject the beverage to a lagering step in which the beverage is stored at near zero temperatures for periods of time ranging from weeks to, in extreme cases, up to several months during which time the yeast cells and proteins settle out and, additionally, the taste of the beer may improve. However, that step alone is not adequate for modem needs especially in view of the time required which is responsible for a significant fraction of the overall costs, and hence, significant effort continues to be expended to eliminate or at least reduce this problem. For example, use of polyvinylpyrrolidone (PVP) to stabilize beet by combining with the polyphenols is well documented, refer to U.S. Pat. Nos. 2,688,550; 2,939,791 and others. U.S. Pat. No. 3,251,693 teaches adding various silicates particularly calcium magnesium or zinc silicates to the beer (or wore) and U.S. Pat. No. 3,940,498 teaches the use of certain acid treated synthetic magnesium silicates. For example U.S. Pat. No. 3,940,498 teaches adding an acid-treated synthetic magnesium silicate to the beer. However, although these methods do alleviate the problem, they by no means eliminate it and are becoming less favored as the addition of any additives or processing aids to all foods is becoming less desirable.

It has also been proposed, in Australian Patent Specification 224576 to convert beer to a slush ice condition which is maintained for up to seventy-two hours and subsequently melting the beer and immediately separating out the precipitated material. If the beer contains material which can re-dissolve before it can be removed by filtration or centrifugation, then a general absorbent material such as bentonite (or asbestos) is added prior to freezing the beer to ensure that the precipitated material is definitely converted into and maintained in an insoluble form before it can re dissolve upon re-melting. Beer has been subjected to freezing in other processes, specifically processes involving the production of beer concentrates. For example, Canadian Patent No. 673,672 involves freezing beer to produce a slurry of concentrated beer, ice and other solids including yeast cells, removing the ice and other solids from the desired concentrated beer, which has concentrated up to five-fold relative to the starting beer. The ice is discarded or passed into a system to recover beer or desirable components thereof that are entrained on the ice. All freeze concentration processes suffer from the fact that the ice removed can carry away excessive amounts of the desired material and recovery of that material which is occluded or retained on the ice, by washing extraction or other means, brings its own problems—refer for example to Canadian Paint No. 710,662. Also, the practical process is usually multistage with successive stages being effected at temperatures reduced relative to earlier stages, this being quite common in the freeze concentration art—refer for example to Canadian Patents No. 601,487 and No. 786,308. This latter patent has the same inventor and proprietor as Canadian Patent No. 673,672 and covers products produced by the latter patent. Despite the quite amazing claims made for the products produced under this patent, it does not seem to have ever been commercially exploited. U.S. Pat. No. 4,885, 184 teaches a process for preparing flavored malt liquors wherein an aged fermented won is freeze concentrated generally to the 20% to 30% alcohol by volume level, and various flavourings then added. In the freeze concentration process described in Canadian Patent No. 872,210 it is the wort which is freeze concentrated, this apparently providing efficiencies in obtaining a higher-yield or extract from the brew materials than is obtained in a regular brew.

As indicated above, the development of haze in beer is, obviously, still a significant practical problem despite the extensive efforts made in the past, and still being made, to solve it.

An object of the present invention is to provide a process for continuously processing beer at low temperatures.

BRIEF STATEMENT OF INVENTION

It has now been found that if, in the brewing process, and preferably prior to aging the temperature of beer is rapidly reduced to approximately its freeing point in a manner such that only a minimal mount of ice crystals are formed, and the thus cooled beer is contacted with an agitated slurry of ice crystals for a relatively short period of time and without collateral concentration of the beer, the aging stage of the brewing process can be significantly reduced, and, perhaps, even eliminated.

The process of the present invention ensures that all the beer is invariably subjected to the same low temperature treatment and hence is uniformly processed.

Moreover, the resulting finished beer is less harsh, smoother and more mellow compared to regularly processed beer, especially if care is taken to remove substantially all of the yeast cells emanating from the fermentation from the green beer prior to it being treated.

DETAILED STATEMENT OF INVENTION

According to the present invention there is provided a process for preparing a fermented malt beverage wherein" brewing materials are mashed with water, the resulting mash is heated and won separated therefrom; the wort is boiled, cooled and fermented; and, the green beer is subjected to a finishing stage, which includes aging to produce the beverage. The improvement according to the invention comprises subjecting the beer to a cold stage comprising rapidly cooling the beer to a temperature of about its freezing point in such a manner that ice crystals are formed therein only in minimal amounts; mixing the cooled beer for a short period of time with a beer slurry containing ice crystals without any appreciable increase in the amount of ice crystals in the resulting mixture; and drawing-off treated beer from the mixture.

In an preferred embodiment of the invention the substrate beer is green beer and the treatment is effected prior to aging thereof.

In a further embodiment therefore, the present invention provides a process for preparing a fermented malt beverage wherein brewing materials are mashed with water, and the resulting mash is heated and the wort separated therefrom. The wort is then boiled, cooled and fermented and the resulting green beer is subjected to a finishing stage, which includes aging to produce a finished beverage. The improvement comprises prior to aging, subjecting the green beer to a cold stage comprising rapidly cooling the beer to a temperature of about its freezing point in such a manner that, at most, only ice crystals of a small size, and in minimal amounts, are produced thereto, treating the thus cooled beer for a short period of time in a fluidized bed of ice crystals having a size generally greater than that of the small crystals, such that there is no appreciable rise in the mount of ice, and recovering the so-treated green beer.

In carrying out the process of the present invention the cooling stage is conveniently carried out in a scraped surface heat exchanger and the mixing stage, which may comprise mixing the cooled green beer with an agitated slurry of ice crystals in green beer, may be conveniently effected in what is often termed in the literature as a "crystallizer" unit which forms part of commercially available freeze concentration systems. Such a system and associated apparatus are described for example in U.S. Pat. No. 4,004,886 to Thijssen et al, the disclosure of which is hereby incorporated by reference. As will be readily appreciated, only a portion of the device described in U.S. Pat. No. 4,004,886 is used in carrying out the process of the present invention and that is operated in a very different manner to that taught in that reference. Essentially, it is used to provide a treatment zone containing an amount of an agitated flurry of preferably larger ice crystals which maybe considered to function as a fluidized bed in which the beer is treated as it passes therethrough, the mount of crystals in the "bed" are not appreciably increasing throughout the process. The treated beer is separated from the ice crystals which remain in the treatment zone, until, periodically, following from at the end of each brewing cycle during which from 1,200 to 15,000 hectoliters of beer are treated, the ice crystals are removed and discarded.

Initially, the process can be initiated by adding the crystals, (preferably relatively larger crystals—usually having an average size of from 100 to 3,000 microns) in "bulk" to the treatment zone. Alternatively, they can be generated in situ by introducing the cooled beer into the zone and, then over a period of time, and under conditions in which the preferably relatively smaller ice crystals, (which comprise only about 5%, and usually about 2% of the introduced cool beer volume), will grow and produce the desired mount of larger crystals in the zone.

It has been found that the treatment zone operates in an efficient steady manner when it contains about 20% to 25% by volume of said crystals although amounts of from 5% to 35% by volume of said crystals may be used depending on for example, the type of beer being treated. The specific mount may vary slightly during processing but any such variances may be monitored and a feedback system is arranged to instruct the heat exchanger or equivalent cooling system to increase or decrease, as required, the temperature of the cooled green beer to re-balance the system. Such systems, e.g. based on determination of the ice content by electric conductivity, are readily available.

It has been found that the above system functions in an efficient manner if the green beer, usually exiting the fermenter at say 10° C. to 17° C. is precooled to between about −1° C. to 5° C. and is then passed through the scraped surface heat exchanger or other suitable cooling device where it is super cooled to as low as about −5° C., usually −4.5° C. to −1° C. That same temperature is generally maintained in the treatment zone.

The actual freezing temperature of the beer substrate and hence the temperature attained in the cooling zone depends on a number of factors including the beer composition, Plato value, but especially the alcohol value. For example, with a green beer having .a Plato value of about 16° P as is routinely the case in high gravity brewing, and an alcoholic content of about 7% to 7.5% alcohol by volume, the green beer is advantageously cooled to a temperature of about −4° C. before being introduced into the treatment zone. The higher the alcohol content, the lower the temperature which will generally be required to achieve the product having the desired characteristics.

It should be noted that the two components of this specific system, the heat exchanger and the treatment vessel operate full of liquid medium and hence there is no need to provided an inert atmosphere which would otherwise have been required.

A major advantage of the present invention is its capability to be carried out in a continuous manner without the ice-containing treatment zone becoming inoperative because of buildup of ice which dogs the system, a problem with the various prior art processes.

BRIEF DESCRIPTION OF THE DRAWINGS

The process of the present invention will be more fully described but not limited by reference to the following drawings in which.

In the following a preferred treatment of green beer prior to aging is described, although it is possible to effect the cold stage treatment post aging if desired.

Figure 1:
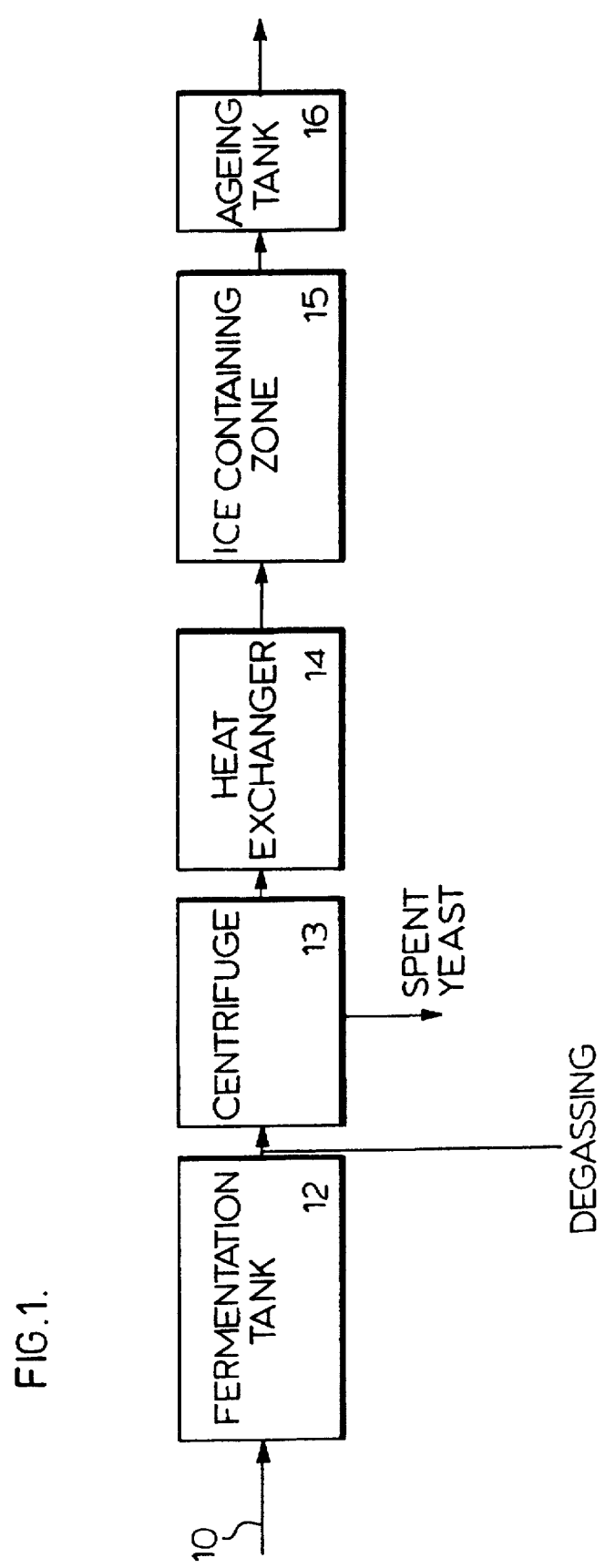
FIG. 1 is a schematic drawing showing the steps involved in the treatment of the green beer according to the present invention.

Turning to FIG. 1, wort from a lauter tun (not shown) passes through line 10 to fermentation vessel 12 where it is pitched with yeast and fermented in the usual manner. Following completion of the fermentation, the spent yeast is removed by centrifuge 13. Man's usual normal methods of removing the yeast cells may leave a minor amount of yeast cells in the green beer. However, these residual cells have been found to have adverse effects on the finished beer, it is thought due to their being lysed in the ice treatment according to the present invention and the resulting cell fragments have adverse effects on the organoleptic properties of the finished beer. Consequently, it is much preferred that extra care be exercised and if necessary, more efficient separating equipment utilized to remove substantially all of the yeast prior to the green beer being treated according to the present invention.

The brewed green beer is then rapidly cooled in a scraped surface heat exchanger 14 where cooling to the freezing point of the beer is effected, this will generally be in the range of $-1°$ C. to $-5°$ C., normally $-2°$ C. to $-4°$ C. depending on many factors including the specific alcohol content. The cooling is effected in a short period, generally less than 60 and usually a few seconds. A minor amount of small crystals are formed, less than 5%, generally 2% or less by volume, the treatment being adapted to prevent the growth of large crystals or an excessive amount of small crystals (considered to be less than about 9–10 microns). In fact, less than about 2% of the volume of the beer is converted to ice in the cooling stage. The so cooled beer is then passed immediately to the ice-containing treatment zone 15. This zone is completely filled with a slurry comprising of ice crystals and the green beer, which slurry is maintained in a constant state of agitation to render it homogenous. The ice crystals are preferably significantly larger in size, by a factor of from 10 and 100 times, than the crystals contained in the beer being treated. The treatment zone is arranged to operate using a combination of insulation around the zone which includes a feedback mechanism in accordance with which, in response To signals from ice sensors in the treatment zone, a reduction or increase in the amount of ice is corrected by ensuring the green beer is further cooled or is less cooled, respectively. Thus the objective of maintaining a fixed amount usually about 20% to 22% of the volume of the zone as larger crystals is maintained as is the temperature of the treatment. The ability to consistently maintain the low processing temperatures without the ice clogging the system is a critical aspect of the present invention. The ice treatment zone may, initially be loaded with the body of ice crystals but more conveniently, these are produced in situ upon startup of the system by running the heat exchange unit in such a manner as to produce major mounts of small crystals which are allowed to grow to the desired size in the treatment zone. Loading the zone in this manner may take from about one to several hours depending on many factors including the type/capacity of heat exchanger used and the alcohol content of the green beer.

The residence time of the green beer in the ice treatment zone is relatively short, less than one hour, generally up to 15 minutes, especially 5 to 15 minutes only, following which, the treated beer is transferred to aging tank 16. It is then finished in the usual manner.

This system is elegantly practical in that:

(a) it is not complex; there are no counter-current flows and, in fact, requires only a single uni-directional flow, (namely that of the fluid substrate being treated) and hence requires only a minimum of equipment and is simple to operate;

(b) the treatment does not collaterally concentrate the green beer and hence there is no accumulation of, or on-going need for constant removal of, ice crystals (these requiring only their being discarded at the end of a brewing cycle). Obviously, the ice is not subsequently treated in any manner, there being so little of it there is virtually no entrained beer, etc., associated with it.

(c) the ice treatment is energy efficient being preferably operated at substantially the same temperature as that at which the green beer exits the heat exchanger;

(d) it is a process stage which gently processes the green beer at a high rate and is readily and conveniently incorporated into present brewing processes with little disruption to existing plant layouts;

(e) it is a continuous and rapid process thereby incurring small additional cost but delivering beneficial results as far as desirable product characteristics are concerned, especially a significant, up to 50% or more, increase in chill stability as well as very positive organoleptic properties;

(f) using the equipment described, both the heat exchanger and the separation vessel are full with liquid medium and hence do not require maintenance of an inert or carbon dioxide atmosphere.

Figure 2:
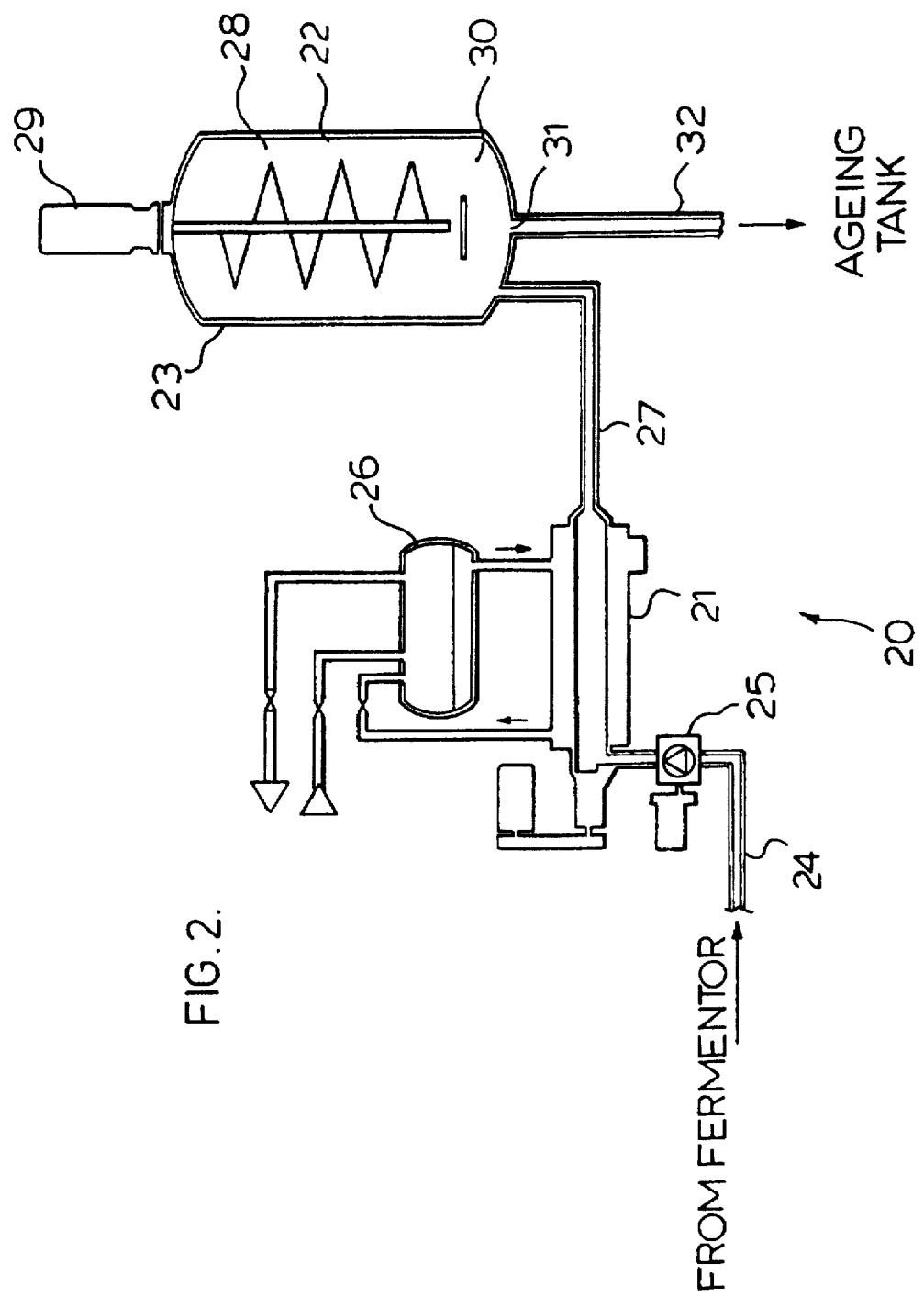
FIG. 2 is a diagrammatic cross-sectional view of a simple pilot plant system for effecting the cold processing stage, i.e. the cooling and ice-treating the beer according to the present invention; and, FIG. 3 is a flow diagram of a plant adapted to treat green beer according to the present invention.

Turning to FIG. 2, this shows a pilot plant for a beer cooling and ice treatment stage or system, generally designated 20, consisting of a scraped surface heat exchanger 21 and a treatment or separator vessel 22 having a capacity of 120 liters, which defines the ice containing treatment zone 23.

Pipe 24 connects the fermentor or green beer storage tank (both not shown) to scraped surface heat exchanger 21, circulating pump 25 being arranged in the pipe 24 to provide for transfer of the beer. Heat exchanger 21 is provided with cooling system 26. Pipe 27 connects the heat exchanger 21 directly to vessel 22 and it constitutes the inlet for the cooled green beer. Vessel 22 is provided with a stirrer or agitator 28 which is adapted to be driven by motor 29 and a separator or filter member 30 which surrounds the outlet 31 leading to pipe 32, which leads to the ageing tank (not shown). Separator 30 is extremely important in that is must ensure that the larger crystals forming the ice-bank are prevented from leaving the treatment zone while, at the same time, must allow passage of a small number of smaller crystals which may not melt during processing as do the majority. Further it must be designed and/or otherwise adapted, for example, being provided with scrapers, to prevent it being clogged by the smaller particles.

Procedure

The ice treatment zone was loaded with the desired volume of large ice crystals as follows. The temperature of the refrigerant in the heat exchanger cooling system was maintained at from −20° C. to −15° C. and regularly produced green beer of alcohol content 7.4% by volume and at a temperature of from 4° C. to 8° C. was passed therethrough, its temperature thereby being reduced to −4.5° C. Small crystals were formed in the body of the liquid in an amount of just less than 2% by volume. The cooled green beer was then passed into vessel 20 which had agitator 36 in operation to ensure constant homogeneity of the contents. Initially, there was no ice in the vessel which was totally fired with the cooled green beer at a temperature of −4° C. After one hour, 3.6% of the volume of vessel 20 was composed of large ice crystals, that number rising to 20% after a further hour, that representing about 24 kilograms of larger ice crystals. It was determined that 20% was adequate to effect the desired treatment, i.e. to ensure that all of the beer is processed at the desired low temperature and no clogging of the equipment occurred.

In fact, the system readily attained a steady state condition under the above conditions and subsequently, 1,100 liters of the green beer was treated in the vessel and then finished to the desired product in the usual manner.

The above procedure was repeated with different green beer substrates. Evaluations were conducted to determine the polyphenol content of the substrate green beer prior, and subsequent to, the treatment according to the present invention. The results were as follows:

| Brew | Pre-Treatment | Post Treatment |
| --- | --- | --- |
| 1 | 144 | 130 |
| 2 | 152 | 148 |
| 3 | 184 | 165 |
| 4 | 195 | 144 |
| 5 | 192 | 144 |
| 6 | 182 | 153 |

As discussed above, it is considered that a major factor in haze production is the slow precipitation of polyphenyls and hence, the reduction thereof by the process of the present invention demonstrates the increased stability of about 50% as compared with regular beer against chill haze of the products treated according to the present invention. Moreover, the beer exhibited outstanding flavour characteristics, especially smoothness.

Haze Analyses

Various samples of the above products were evaluated for haze formation by forced aging tests:

| | No Treatment | | Post Treatment | |
| --- | --- | --- | --- | --- |
| Brew | WH | IC | WH | IC |
| 4 | 144 | 317 | 40 | 42 |
| 5 | 178 | 538 | 39 | 42 |
| 6 | 115 | 221 | 34 | 39 |

Note:
WH means "warm haze"
IC means "initial chill haze"

These clearly demonstrates the stability against haze imparted by the process of the present invention.

Figure 3:
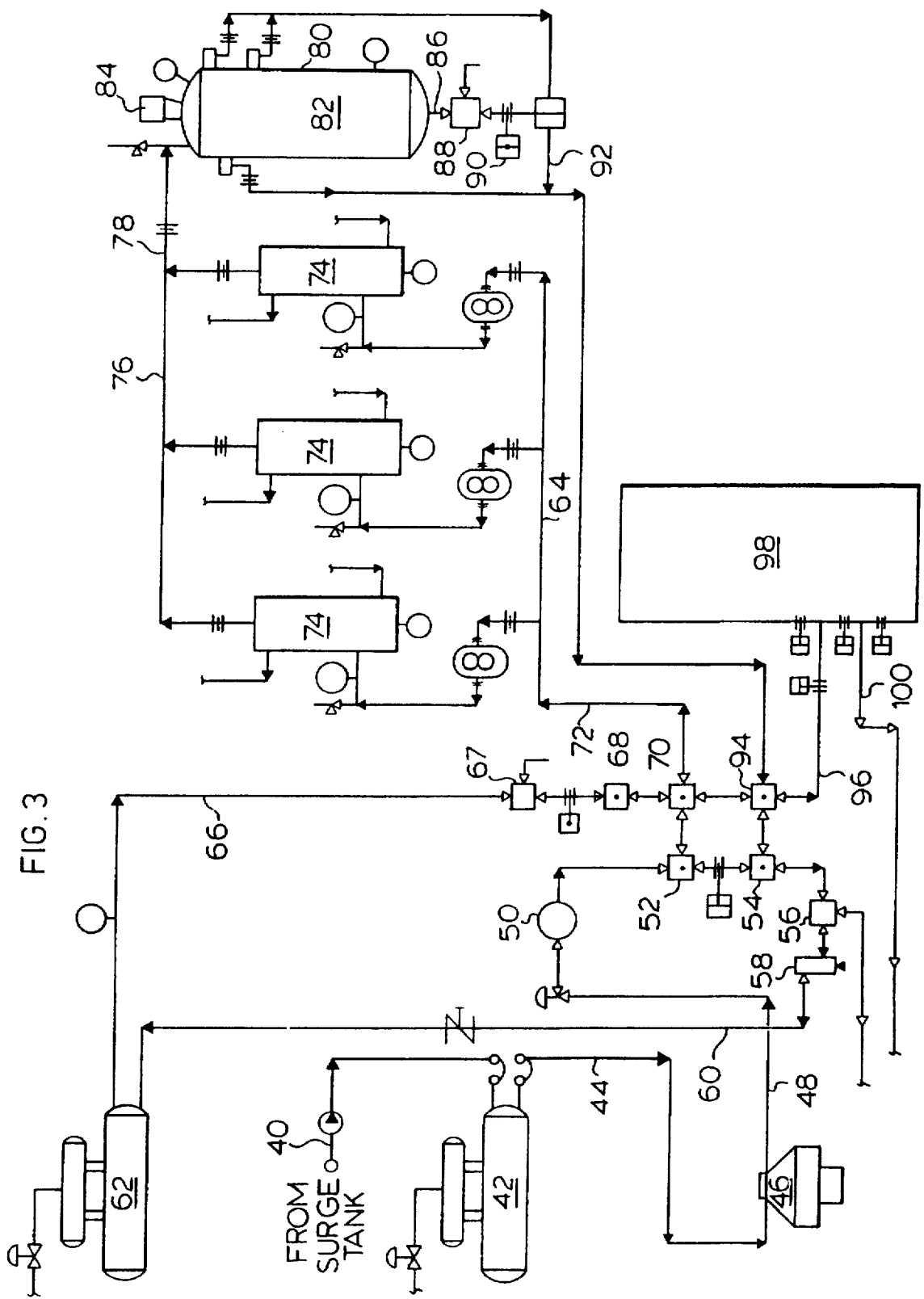

Turning to FIG. 3, this is a flow sheet of a commercial scale facility which may be used to process beer, and again green beer is usual as the example, according to the present invention. The facility has a green beer inlet pipe 40 connecting a fermentor or green beer surge/storage tank (not shown) to a beer cooler 42 which in turn is connected via pipe 44 to a Westfalia beer centrifuge 46. This centrifuge is maintained at optimum efficiency to ensure that for all practical purposes, virtually all yeast cells from the fermentation stage are eliminated from the green beer. The centrifuge 46 is connected through pipe 48, flow meter 50, valves 52, 54, 56 and 58 and pipe 60 to beer cooler 62, the latter being connected to heat exchange mainfold 64 by pipes 66, valves 67, 68 and 70 and pipe 72. Alternatively, centrifuge 46 can be connected directly to manifold 64 by pipe 48, through valves 52 and 70 and pipe 72. The manifold 64 serves scraped surface heat exchangers 74. Three heat exchangers are shown arranged in parallel but, obviously, the number or type of the heat exchangers may vary depending on requirements. A second manifold 76 is arranged to combine all material exiting the heat exchangers 74 and deliver same via pipe 78 to treatment or separator vessel 80 which encloses treatment zone 82 having a volume of 90 hectoliters. Vessel 80 is fully insulated and is provided with an agitator mechanism (not shown) driven by motor 84, and an exit pipe 86 which, via valves 88 and 90, connects to pipe 92 which, via valve 94 and pipe 96 connects pipe 72 to aging tank 98. Tank 98 is provided with beer outlet pipe 100. Vessel 80 is also provided with ice monitors which identify changes from the desired "steady state" operating condition as to ice crystal content and automatically instruct the heat exchangers to provide more, or less, cooling to return the treatment zone to its operating steady state condition. If it deviates from the set conditions vessel 80 is also provided with a separator device (not shown) which prevents all but the smaller ice crystals from exiting the vessel thereby maintaining the "fluidized bed" feature as the ice slurry is agitated.

This equipment was obtained from Nifo Process Technology B.V., De Beverspijken 7, 5221 EE's-Hertogenbosch, The Netherlands.

In operation, green beer alcohol content 7% by volume is obtained from a regular fermentation at a temperature of about 15° C. and is introduced into the system through pipe 40, passed through beer cooler 42 leaving at a temperature of 8° C. to 10° C. It is then passed through a dropping cooler 62 which further reduces its temperature even further to −1.5° C. thereby reducing the load on the scraped heat exchangers 74 through which the beer is subsequently passed. The temperature of the green beer exiting heat exchangers 74 is about −4° C. and it comprises about 2% by volume of small crystals having an average size of between 0.1 and 10 microns. The residence time of green beer in the heat exchangers is only about one second and the beer is then introduced immediately through manifold 78 into the ice treatment zone contained in vessel 80. Initially, this zone does not contain the required loading of ice slurry and hence this was generated over a two hour start-up period when about 1,800 kilograms of larger ice crystals having an average size of 200 to 3,000 microns were created. Vigorous agitation maintains the slurry in a homogenous mass which is retained in the vessel by the separator while cooled green beer was treated at the rate of 450 hectoliters per hour, this equating to an average beer residence time of about 12 minutes. The temperature in the treatment zone is maintained at about −4° C. without the addition or removal of heat. The amount of ice crystals in the zone, or "fluidized bed" remained substantially constant. The bed may be maintained for extended periods but, from a practical viewpoint, it is removed and discarded at end of a brewing cycle which is generally following its being used in the treatment of from 1,200 to 15,000 hectoliters of green beer.

The amount of water exiting the system as ice during the course of the system's normal operation in accordance with the process of the present invention, is only 0.1% to at most 1.5% and consequently the concentration of the beer remains essentially constant.

In summary, the process of the present invention provides simple to operate continuous process, a balanced beer which is less harsh, more mellow and has greatly increased shelf life due to increased physical stability compared with regular beers, this latter quality itself providing significant economic benefit in greatly reducing the time required for regular aging.

We claim:

1. A process for preparing a fermented malt beverage wherein brewing materials are mashed with water, the resulting mash is heated and wort separated therefrom, said wort is boiled, cooled and fermented and the beer is subjected to a finishing stage, which includes aging, to produce said beverage, the improvement comprising centrifuging said beer to remove substantially all yeast cells remaining from fermentation, subjecting the beer to a cold stage comprising rapidly cooling said beer to a temperature of about its freezing point in such a manner that ice crystals are formed therein only in minimal amounts, mixing said cooled beer for a short period of time with a beer slurry containing ice crystals without any appreciable increase in the amount of ice crystals in the resulting mixture, and extracting so treated beer from said mixture.

2. The process according to claim 1 wherein said cooling is effected in less than about 60 seconds.

3. The process according to claim 1 wherein said cooling is effected in less than 30 seconds.

4. The process according to claim 1 wherein said cooling is effected in about 5 seconds.

5. The process according to claim 1 wherein said mixing is effected for a period not exceeding 60 minutes.

6. The process according to claim 1 wherein said mixing is effected for less than 30 minutes.

7. The process according to claim 1 wherein said mixing is effected for 5 to 20 minutes.

8. The process according to claim 1 wherein said beer is degassed prior to being treated.

9. The process according to claim 1 wherein said beer is green beer.

10. A process for preparing a fermented malt beverage wherein brewing materials are mashed with water, the resulting mash is heated and wort separated therefrom, said wort is boiled, cooled and fermented and the beer is subjected to a finishing stage, which includes aging, to produce said beverage, the improvement comprising, prior to aging, centrifuging said beer to remove substantially all yeast cells remaining from fermentation, subjecting the beer to a cold stage comprising rapidly cooling said beer to a temperature of about its freezing point in such a manner that ice crystals are formed therein only in minimal amounts, mixing said cooled beer for a short period of time with a beer slurry containing ice crystals without any appreciable increase in the amount of ice crystals in the resulting mixture, and extracting so-treated beer from said mixture.

11. The process according to claim 10 wherein said cooling is effected in less than about 60 seconds.

12. The process according to claim 10 wherein said cooling is effected in less than 30 seconds.

13. The process according to claim 10 wherein said cooling is effected in about 5 seconds.

14. The process according to claim 10 wherein said mixing is effected for a period not exceeding 60 minutes.

15. The process according to claim 10 wherein said mixing is effected for less than 30 minutes.

16. The process according to claim 10 wherein said mixing is effected for 5 to 20 minutes.

17. The process according to claim 10 wherein said beer is degassed prior to being treated.

18. The process according to claim 10 wherein said beer is green beer.

19. A process for preparing a fermented malt beverage wherein brewing materials are mashed with water, the resulting mash is heated and wort separated therefrom, said wort is boiled, cooled and fermented and the beer is subjected to a finishing stage, which includes aging, to produce said beverage, the improvement comprising, prior to aging, centrifuging said beer to remove substantially all yeast cells remaining from fermentation, subjecting the beer to a cold stage comprising rapidly cooling said beer to a temperature of about its freezing point in such a manner that, at most, only ice crystals of a small size, and in minimal amounts, are produced therein, treating said beer for a short period of time in a fluidized bed of ice crystals having a size greater than that of said small crystals, such that there is no appreciable rise in the amount of ice, and recovering the beer.

20. The process according to claim 19 wherein said cooling is effected in less than about 60 seconds.

21. The process according to claim 19 wherein said cooling is effected in less than 30 seconds.

22. The process according to claim 19 wherein said cooling is effected in about 5 seconds.

23. The process according to claim 19 wherein said treating is effected for a period not exceeding 60 minutes.

24. The process according to claim 19 wherein said treating is effected for less than 30 minutes.

25. The process according to claim 19 wherein said treating is effected for from 5 to 20 minutes.

26. The process according to claim 19 wherein said green beer is degassed prior to being treated.

27. The process according to claim 19 wherein said beer is green beer.

* * * * *